(12) United States Patent
Tyler et al.

(10) Patent No.: US 9,324,976 B2
(45) Date of Patent: Apr. 26, 2016

(54) ELECTROCHEMICAL CELL HAVING A FIXED CELL ELEMENT

(71) Applicant: Johnson Controls Technology Company, Holland, MI (US)

(72) Inventors: Matthew R. Tyler, Brown Deer, WI (US); Jason D. Fuhr, Sussex, WI (US)

(73) Assignee: Johnson Controls Technology Company, Holland, MI (US)

( * ) Notice: Subject to any disclaimer, the term of this patent is extended or adjusted under 35 U.S.C. 154(b) by 237 days.

(21) Appl. No.: 13/768,491

(22) Filed: Feb. 15, 2013

(65) Prior Publication Data

US 2014/0234676 A1 Aug. 21, 2014

Related U.S. Application Data

(60) Provisional application No. 61/601,512, filed on Feb. 21, 2012.

(51) Int. Cl.
*H01M 2/22* (2006.01)
*H01M 2/02* (2006.01)
*H01M 2/12* (2006.01)

(52) U.S. Cl.
CPC ............ *H01M 2/024* (2013.01); *H01M 2/1223* (2013.01); *H01M 2/22* (2013.01); *H01M 2/022* (2013.01)

(58) Field of Classification Search
CPC ... H01M 2/12; H01M 2/1217; H01M 2/1223; H01M 2/1229; H01M 2/0235; H01M 2/0421; H01M 6/085
See application file for complete search history.

(56) References Cited

U.S. PATENT DOCUMENTS

| | | | | |
|---|---|---|---|---|
| 6,010,802 A | * | 1/2000 | Passaniti et al. | ............... 429/172 |
| 6,245,457 B1 | * | 6/2001 | Romero | .............. H01M 2/1223 |
| | | | | 429/121 |

(Continued)

FOREIGN PATENT DOCUMENTS

| | | |
|---|---|---|
| EP | 1710858 A1 | 10/2006 |
| EP | 2416406 | 2/2012 |
| WO | WO 2010059957 | * 5/2010 |

OTHER PUBLICATIONS

International Search Report and Written Opinion for PCT No. PCT/US2013/026717 dated Sep. 9, 2013; 10 pgs.

(Continued)

*Primary Examiner* — Ula C Ruddock
*Assistant Examiner* — Thomas Parsons
(74) *Attorney, Agent, or Firm* — Fletcher Yoder, P.C.

(57) ABSTRACT

An electrochemical cell includes a cell element and a current collector disposed in a housing that includes a vent. The current collector includes an outer member and an inner member coupled together by one or more flexible arms. The outer member is coupled to the cell element and the inner member is coupled to the vent, such that the flexible arms allow axial movement of the inner member with respect to the outer member when the vent moves from an undeployed position to a deployed position. The housing may include a shoulder that holds the cell element in the housing. The electrochemical cell may also include a coil plate provided at an end of the cell element. The coil plate is coupled to an edge of at least one electrode of the cell element. The outer member of the current collector may be coupled to the coil plate and the inner member of the current collector may be coupled to the vent, such that when the vent moves from an undeployed position to a deployed position, the cell element remains substantially fixed within the housing.

18 Claims, 9 Drawing Sheets

(56) References Cited

U.S. PATENT DOCUMENTS

| | | |
|---|---|---|
| 7,601,455 B2 | 10/2009 | Yoon |
| 8,808,900 B2 | 8/2014 | Hyung et al. |
| 2006/0121336 A1 | 6/2006 | Yoon |
| 2009/0029193 A1 | 1/2009 | Onnerud et al. |
| 2011/0189512 A1 | 8/2011 | Onnerud et al. |
| 2012/0212232 A1* | 8/2012 | Ikeda .................. H01M 2/1077 324/426 |

OTHER PUBLICATIONS

CN 201380019721.0 First Office Action dated Feb. 23, 2016.

* cited by examiner

ELECTROCHEMICAL CELL HAVING A FIXED CELL ELEMENT

CROSS REFERENCE TO RELATED APPLICATIONS

This application is a Non-Provisional Application of U.S. Provisional Patent Application No. 61/601,512, entitled "Electrochemical Cell Having a Fixed Cell Element," filed Feb. 21, 2012, which is herein incorporated by reference in its entirety for all purposes.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It also would be desirable to provide a battery module and/or system that includes any one or more of the advantageous features that will be apparent from a review of the present disclosure.

SUMMARY

One exemplary embodiment relates to an electrochemical cell including a cell element having at least one electrode and a coil plate provided at an end of the cell element. The coil plate is coupled to an edge of the at least one electrode. The electrochemical cell also includes a current collector coupled to the coil plate. The current collector includes an outer member and an inner member coupled to the outer member by a plurality of flexible arms configured to allow the inner member to move relative to the outer member. The electrochemical cell also includes a housing having a bottom portion having a vent. The current collector is coupled to the vent. The cell element, coil plate, and current collector are provided within the housing such that when the vent moves from an undeployed position to a deployed position, the cell element remains substantially fixed within the housing.

Another exemplary embodiment relates to an electrochemical cell including a cell element substantially fixed within a housing. The housing includes a vent. The cell also includes a coil plate coupled to an edge of an electrode of the cell element and a current collector coupled to the coil plate. The current collector includes an outer member and an inner member coupled to the outer member by a plurality of flexible arms configured to allow the inner member to move relative to the outer member during deployment of the vent.

Another exemplary embodiment relates to an electrochemical cell including a cell element substantially fixed within a housing and comprising at least one electrode. The cell also includes a coil plate coupled to an edge of the at least one electrode and a current collector conductively coupled to the coil plate and to a vent of the housing. The current collector includes an outer portion and an inner portion flexibly coupled to the outer portion to allow the inner portion to move relative to the outer portion during deployment of the vent.

DETAILED DESCRIPTION

Figure 1:
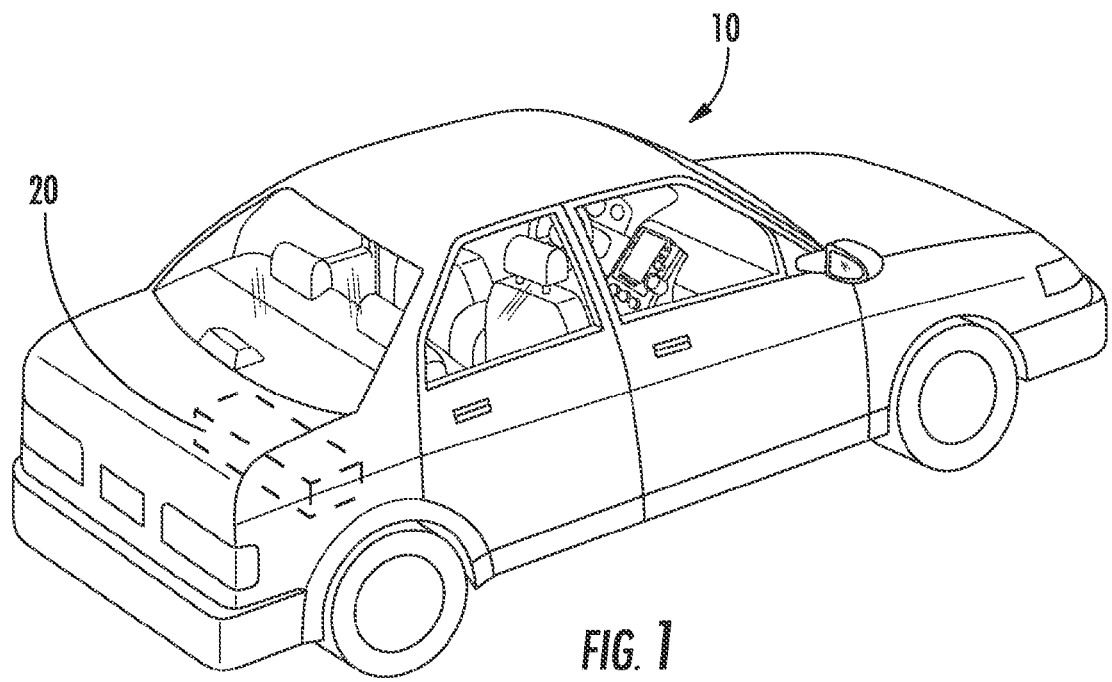
FIG. 1 is a perspective view of a vehicle including a battery module according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an xEV, where the term "xEV" is defined herein to include all of the following vehicles, or any variations or combinations thereof, that use electric power for all or a portion of their vehicular motive force, including present 48V and 96V systems. As will be appreciated by those skilled in the art, hybrid electric vehicles (HEVs) combine an internal combustion engine propulsion system and a battery-powered electric propulsion system. The term HEV may include any variation of a hybrid electric vehicle, such as micro-hybrid and mild hybrid systems, which disable the internal combustion engine when the vehicle is idling and utilize a battery system to continue powering the air conditioning unit, radio, or other electronics, as well as to kick-start the engine when propulsion is desired. The mild hybrid system may apply some level of power assist to the internal combustion engine, whereas the micro-hybrid system may not supply power assist to the internal combustion engine. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles.

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power. Moreover, the battery system 20 may also be useful beyond the application of xEVs. For example, the battery system 20 may be suitable for energy storage applications, where the battery system 20 may act as energy storage for an alternative energy source, such as, a wind turbine or a solar panel, for example. Further applications of the battery system 20 may include additional battery modules, stationary power devices, portable battery modules, battery modules for HVAC systems, and use as an uninterruptable power supply, among other things.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
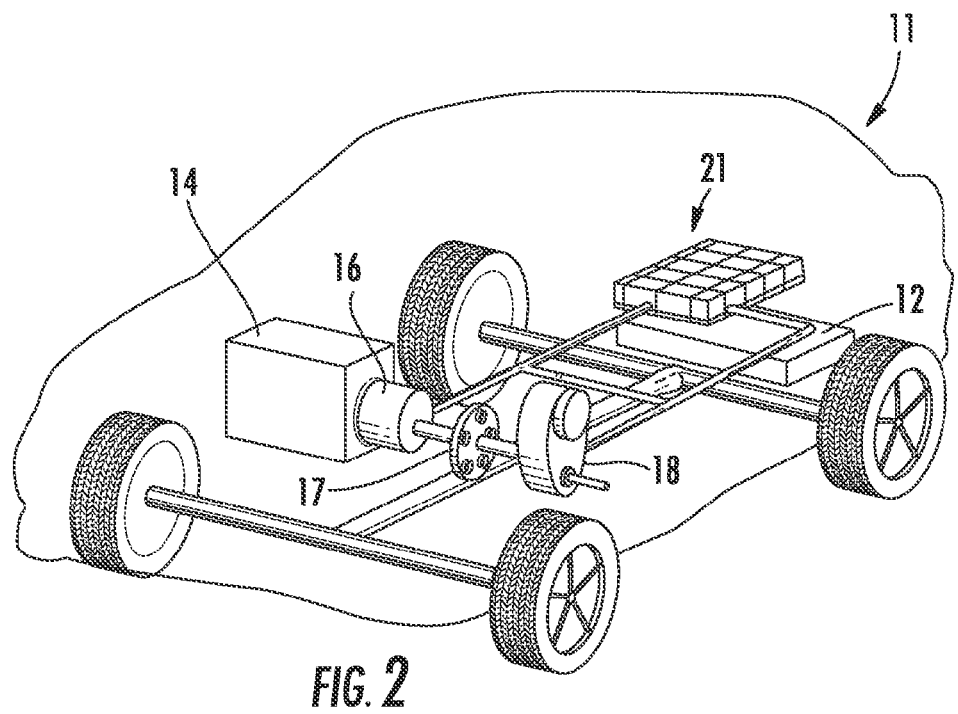
FIG. 2 is a cutaway schematic view of a vehicle including a battery module according to an exemplary embodiment.

FIG. 2 illustrates a cutaway schematic view of a vehicle 11 provided in the form of an HEV according to an exemplary embodiment. A battery system 21 is provided toward the rear of the vehicle 11 proximate a fuel tank 12 (the battery system 21 may be provided immediately adjacent the fuel tank 12 or may be provided in a separate compartment in the rear of the vehicle 11 (e.g., a trunk) or may be provided elsewhere in the vehicle 11). An internal combustion engine 14 is provided for times when the vehicle 11 utilizes gasoline power to propel the vehicle 11. An electric motor 16, a power split device 17, and a generator 18 are also provided as part of the vehicle drive system.

Such a vehicle 11 may be powered or driven by just the battery system 21, by just the engine 14, or by both the battery system 21 and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery system 21, the type of vehicle 11, the type of vehicle technology (e.g., EV, HEV, PHEV, etc.), and the battery chemistry, among other features, may differ from those shown or described.

According to an exemplary embodiment, the battery system 21 includes a plurality of electrochemical batteries or cells. The battery system 21 may also include features or components for connecting the electrochemical cells to each other and/or to other components of the vehicle electrical system, and also for regulating the electrochemical cells and other features of the battery system 21. For example, the battery system 21 may include features that are responsible for monitoring and controlling the electrical performance of the battery system 21, managing the thermal behavior of the battery system 21, containment and/or routing of effluent (e.g., gases that may be vented from an electrochemical cell through a vent), and other aspects of the battery system 21.

Referring now to FIGS. 3-6, various views of an electrochemical cell 24 are shown according to an exemplary embodiment. A battery system (such as battery system 20, 21) includes a plurality of such electrochemical cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the cells 24 could have other physical configurations (e.g., oval, prismatic, polygonal, etc.). The capacity, size, design, terminal configuration, and other features of the cells 24 may also differ from those shown according to other exemplary embodiments.

Figure 3:
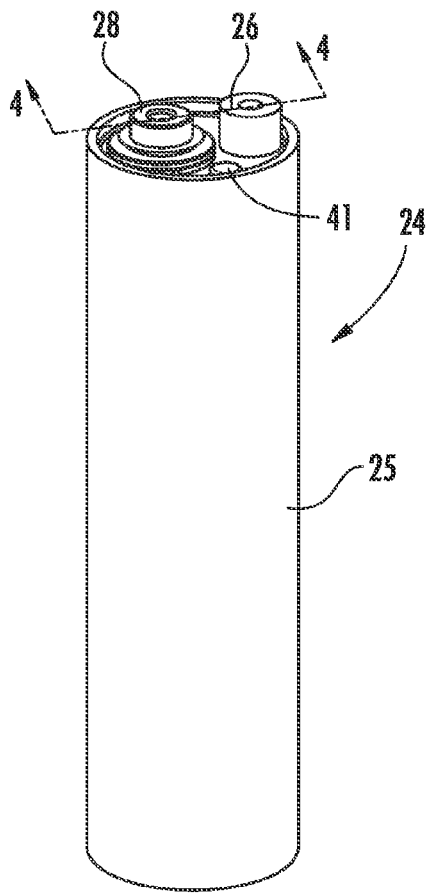
FIG. 3 is a perspective view of an electrochemical cell according to an exemplary embodiment.
Figure 4:
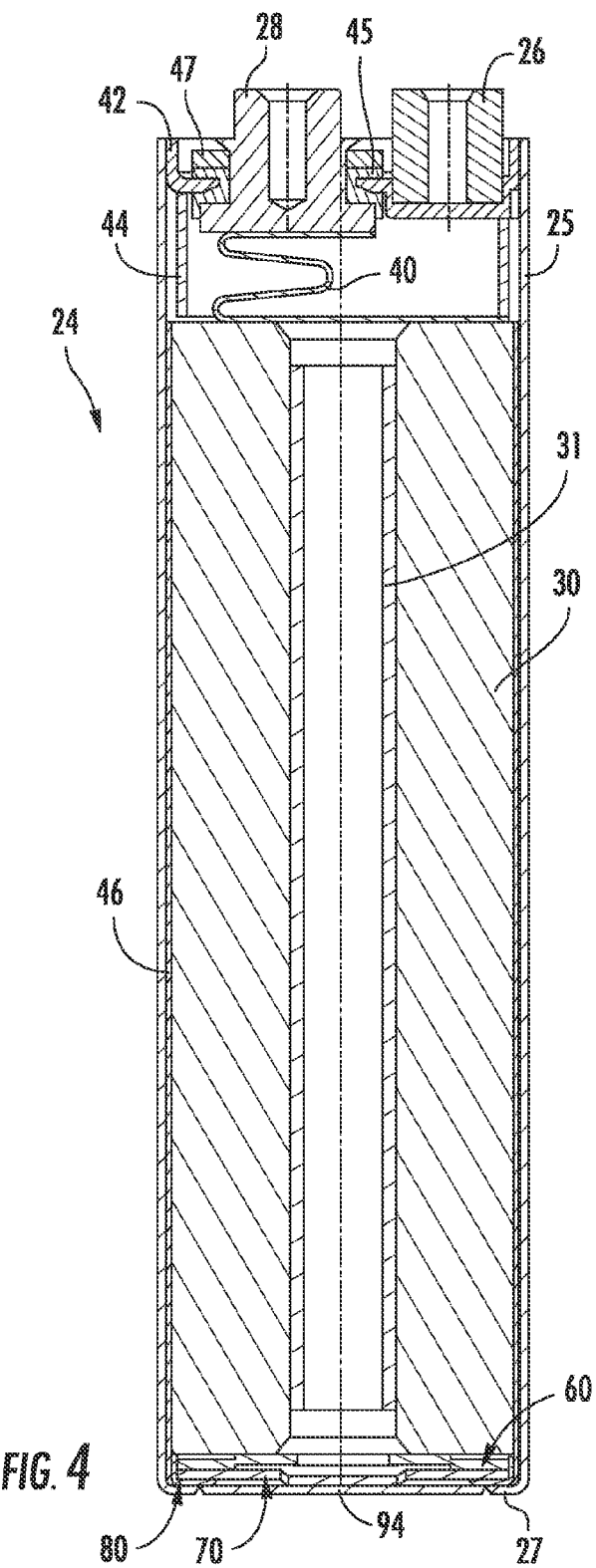
FIG. 4 is a cross-sectional view of the electrochemical cell shown in FIG. 3 taken along line 4-4 in FIG. 3.

FIG. 4 is a cross-sectional view of a cell 24 such as that shown in FIG. 3 taken along line 4-4 in FIG. 3. According to an exemplary embodiment, the cell 24 includes a container or housing 25, a cap or cover 42, a bottom portion 27, and a cell element 30. According to an exemplary embodiment, the housing 25 may be constructed from a conductive material such as a metal (e.g., aluminum or an aluminum alloy, copper or a copper alloy, etc.). According to an exemplary embodiment, the cell element 30 is a wound cell element. According to another exemplary embodiment, the cell element 30 may be a prismatic or oval cell element.

As shown in FIG. 4, according to an exemplary embodiment, the cover 42 is electrically and conductively coupled (e.g., welded) to the housing 25. The positive terminal 26 is electrically and connectively coupled to the cover 42. According to one exemplary embodiment, the positive terminal 26 is provided within a socket or recess provided in the cover 42. According to one exemplary embodiment, the recess and the positive terminal are configured for an interference fit. According to another exemplary embodiment, the positive terminal is laser welded to the cover after the positive terminal has been provided within recess (with or without an interference fit between the positive terminal and the recess).

According to the exemplary embodiment shown in FIG. 4, the negative terminal 28 is provided in an aperture or hole of the cover 42 and is electrically insulated from the cover 42 by an insulating member 45 (e.g., insulators). According to one exemplary embodiment, the insulating member 45 may be two pieces, however, according to an alternative embodiment, the insulating member 45 may be a single unitary member (i.e., one piece).

As shown in FIG. 4, the negative terminal 28 is held in place within the aperture or hole of the cover 42 by the geometry of the negative terminal 28 on one side and a member or washer 47 on the opposite side of the negative terminal 28. As shown in FIG. 4, according to one exemplary embodiment, the negative terminal 28 is deformed (e.g., swaged) to form a projection or deformation, which holds the negative terminal 28, the insulator 45, and the washer 47 in place.

According to one exemplary embodiment, the positive terminal 26 comprises aluminum (e.g., aluminum alloy) or other suitable material. According to one exemplary embodiment, the negative terminal 28 comprises copper (e.g., copper alloy) or other suitable material. Both the positive terminal 26 and the negative terminal 28 may be coated or plated with a nickel material, according to one exemplary embodiment. According to one exemplary embodiment, the insulators may be constructed from any suitable electrically insulating material. For example, the insulators may be constructed from a polyetherimide (e.g., such as ULTEM®, commercially available from SABIC Innovative Plastics of Riyadh, Saudi Arabia) or other suitable polymer material. The washer 47 may be made from a suitable material, such as stainless steel. According to an exemplary embodiment, the housing 25 and/or the cover 42 may be constructed from aluminum (or aluminum alloy) or other suitable material.

Figure 5:
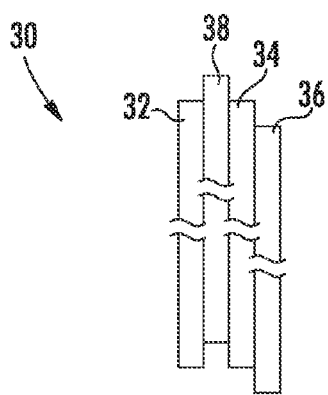
FIG. 5 is a partial cross-sectional view of electrodes and separators for an electrochemical cell according to an exemplary embodiment.
Figure 6:
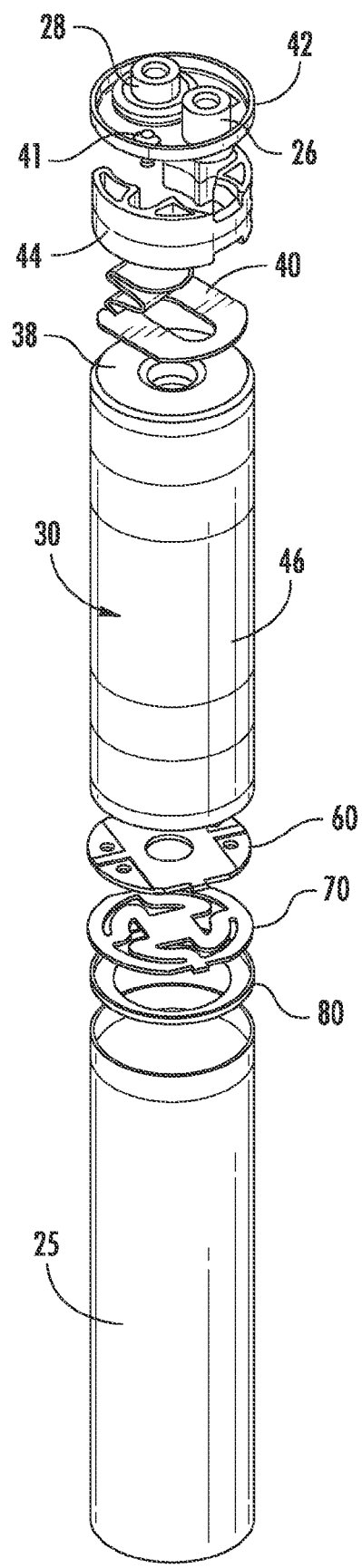
FIG. 6 is a partially exploded view of the electrochemical cell shown in FIG. 3 according to an exemplary embodiment.

As shown in FIG. 5, according to an exemplary embodiment, the cell element 30 includes at least one cathode or positive electrode 36, at least one anode or negative electrode 38, and one or more separators 32, 34. The separators 32, 34 are provided intermediate or between the positive and negative electrodes 36, 38 to electrically isolate the electrodes 36, 38 from each other. According to an exemplary embodiment, the cell 24 includes an electrolyte (not shown). According to an exemplary embodiment, the electrolyte is provided in the housing 25 of the cell 24 through a fill hole. After completion of filling the cell 24 with electrolyte, a fill plug (e.g., such as fill plug 41 as shown in FIGS. 3 and 6) is provided in the fill hole to seal the electrolyte inside the cell 24.

The cell 24 also includes a negative current collector 40 and a positive current collector 70. The negative current collector 40 and the positive current collector 70 are conductive members that are used to couple the electrodes 36, 38 of the cell element 30 to the terminals 26, 28 of the cell 24 (respectively). For example, the negative current collector 40 couples the negative electrode 38 to the negative terminal 28 and the positive current collector 70 couples the positive electrode 36 (e.g., via a coil plate 60) to the positive terminal 26 of the cell 24 (e.g., via the housing 25 and the cover 42). According to the exemplary embodiment shown in FIG. 4, the negative current collector 40 has been at least partially folded or bent back over itself at least one time before being coupled to the negative terminal 28. According to an exemplary embodiment, the current collectors are coupled to the electrodes with a welding operation (e.g., a laser welding operation).

According to an exemplary embodiment, the cell element 30 has a wound configuration in which the electrodes 36, 38 and separators 32, 34 are wound around a member or element provided in the form of a tube or mandrel 31. Such a configuration may be referred to alternatively as a jelly roll configuration. Although the mandrel 31 is shown as being provided as having a generally cylindrical shape, according to other exemplary embodiments, the mandrel 31 may have a different configuration (e.g., it may have an oval or rectangular cross-sectional shape, etc.). It is noted that the cell element 30, although shown as having a generally cylindrical shape, may also have a different configuration (e.g., it may have an oval, prismatic, rectangular, or other desired cross-sectional shape). Furthermore, it should be appreciated that certain configurations of the cell element 30, particularly certain prismatic configurations, may be produced without a mandrel 31.

According to another exemplary embodiment, the electrochemical cell 24 may be a prismatic cell having prismatic or stacked cell elements (not shown). In such an embodiment, the positive and negative electrodes 36, 38 are provided as plates that are stacked upon one another in an alternating fashion, with the separators 32, 34 provided intermediate or between the positive and negative electrodes 36, 38 to electrically isolate the electrodes 36, 38 from each other.

According to an exemplary embodiment, the positive electrode 36 is offset from the negative electrode 38 in the axial direction as shown in the partial cross-sectional view shown in FIG. 5. Accordingly, at a first end of the cell element 30, the wound positive electrode 36 will extend further than the negative electrode 38, and at a second (opposite) end of the cell element 30, the negative electrode 38 will extend further than the positive electrode 36.

One advantageous feature of such a configuration is that current collectors may be connected to a specific electrode at one end of the cell 24 without contacting the opposite polarity electrode. For example, according to an exemplary embodiment, the negative current collector 40 (e.g., as shown in FIG. 4) may be connected to the exposed negative electrode 38 at one end of the cell element 30 and a positive current collector 70 may be connected to the exposed positive electrode 36 at the opposite end of the cell element 30 (e.g., via coil plate 60).

According to an exemplary embodiment, the negative current collector 40 electrically connects the negative electrode 38 to the negative terminal 28 of the cell 24. The negative terminal 28 is insulated from the cover 42 of the housing 25 by an insulator 45, as shown in FIG. 4. According to an exemplary embodiment, the positive current collector 70 electrically connects the positive electrode 36 to the bottom 27 of the housing 25 (e.g., via the coil plate 60). The housing 25 is electrically connected to the cover 42 (e.g., as shown in FIG. 4), which in turn is electrically connected to the positive terminal 26.

According to an exemplary embodiment, as shown in FIGS. 4 and 6, the cell 24 includes a member shown as an insulator or spacer 44 that is configured to insulate the negative current collector 40 and exposed negative electrode 38 from the cover 42 and the positive terminal 26. Additionally, the spacer 44 is configured to aid in fixing or retaining the cell element 30 in place within the housing 25, such that the cell element 30 does not move within the housing 25. The cell 24 also includes a member shown as an insulator 80 provided at the bottom 27 of the cell housing 25 to aid in insulating the positive current collector 70, the coil plate 60 and the bottom portion of the cell element 30 from the bottom 27 of the housing 25.

According to an exemplary embodiment, an electrically-insulating wrap or film 46 (e.g., as shown in FIGS. 4 and 6) is provided around the cell element 30 in order to at least partially electrically insulate the cell element 30 from the housing 25. According to an exemplary embodiment, the film 46 is a polyimide material such as is commercially available under the trade name Kapton® from E. I. du Pont de Nemours and Company, but the film 46 may be made of other materials, such as polypropylene or PPS, for example.

According to an exemplary embodiment, the mandrel 31 is provided in the form of an elongated hollow tube and is configured to allow gases from inside the electrochemical cell to flow from one end of the electrochemical cell (e.g., the top) to the other end of the electrochemical cell (e.g., the bottom). According to another exemplary embodiment, the mandrel 31 may be provided as a solid tube.

The mandrel 31 is illustrated, for example, in FIG. 4 as being provided within the center of the cell element 30. According to an exemplary embodiment, the mandrel 31 does not extend all the way to the very top and bottom of the cell element 30. According to other exemplary embodiments, the mandrel 31 may extend all the way to the top and/or bottom of the cell element 30.

According to other exemplary embodiments, other configurations of the cell element 30 may be used (e.g., configurations that do not include the mandrel 31, have different electrodes 36, 38, different separators 32, 34, different terminals 26, 28, etc.). Additionally, while the cell 24 in FIGS. 4 and 6 is shown according to an exemplary embodiment as having the exposed negative electrode 38 proximate to the top of the cell 24 and the exposed positive electrode 36 proximate to the bottom of the cell 24, according to other exemplary embodiments, the orientation of the cell element 30 (and thus the positions of the current collectors) may be reversed. Additionally, according to other exemplary embodiments, the terminals 26, 28 of the cell 24 may be provided on opposite ends of the cell 24 (e.g., a negative terminal 28 may be provided on the top of the cell 24 and a positive terminal 26 may be provided on the bottom of the cell 24).

Figure 7:
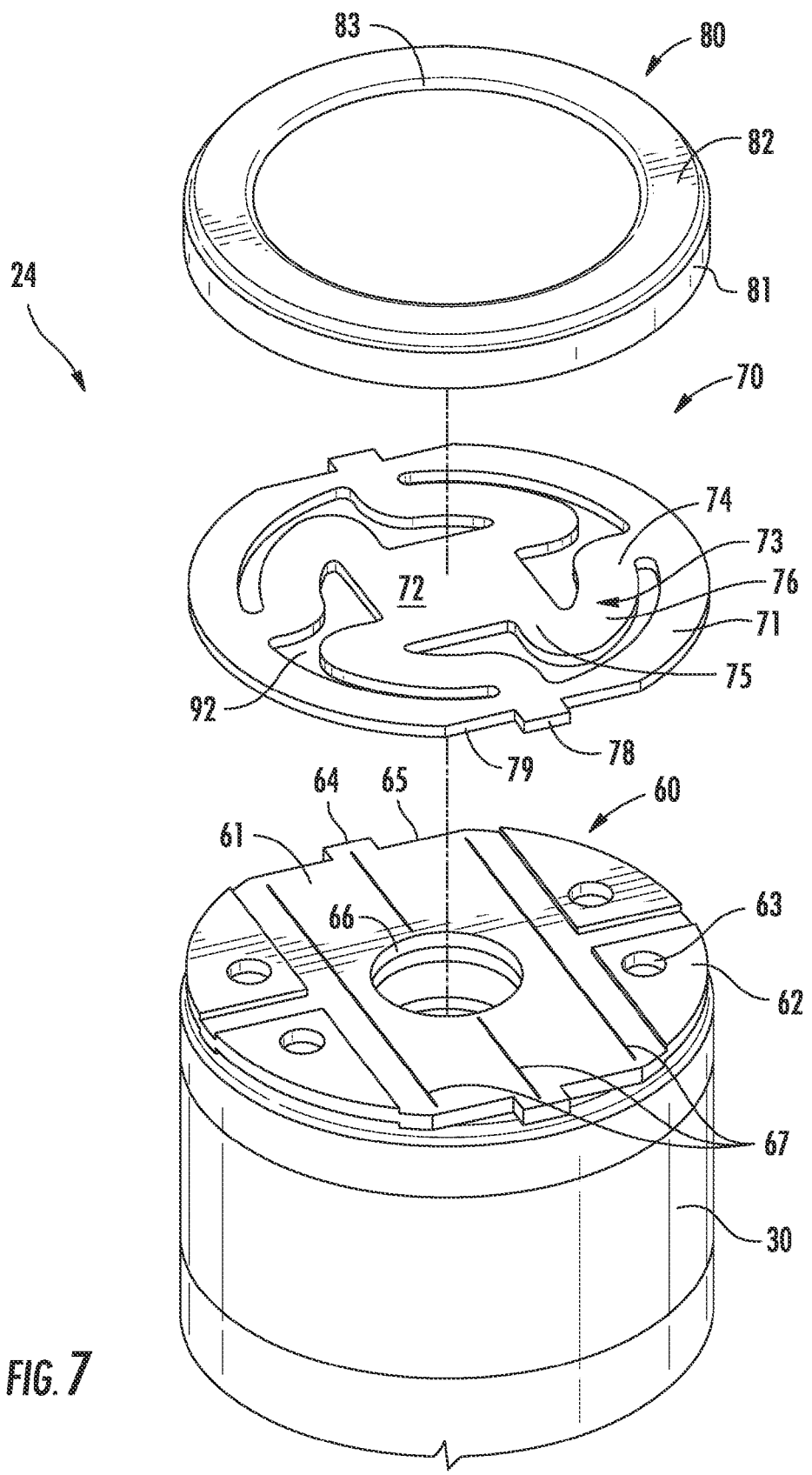
FIG. 7 is a partially exploded view of a portion of the electrochemical cell shown in FIG. 3 showing an insulator, a current collector, and a coil plate coupled to an end of a cell element according to an exemplary embodiment.

Referring now to FIG. 7, a portion of the electrochemical cell 24 is shown according to an exemplary embodiment. As shown in FIG. 7, a member shown as a coil plate 60 is shown coupled (e.g., welded) to an end of the cell element 30 according to an exemplary embodiment. The coil plate 60 may be formed from a relatively thin sheet of conductive material (e.g., sheet metal), by for example, a stamping operation (e.g., a multi-stage progressive die), a laser cutting operation, a wire cutting operation, etc. or may be formed by an extrusion process. According to an exemplary embodiment, the coil plate 60 may be formed from a material having a thickness of between approximately 0.5 and 2 millimeters, but may have a greater or lesser thickness according to other exemplary embodiments. According to various exemplary embodiments, the coil plate 60 may be formed from any of a wide variety of conductive materials such as aluminum or an aluminum alloy (e.g., for a positive coil plate), copper or a copper alloy (e.g., for a negative coil plate), nickel-plated copper or an alloy thereof, etc.

As seen in FIG. 7, according to an exemplary embodiment, the coil plate 60 includes a generally circular body 61 having a plurality of raised portions 62 near the outer edge of the body 61. According to one exemplary embodiment, the raised portions 62 are configured for aiding in allowing gases within the cell to exit the cell (e.g., during deployment of a vent). As shown, each raised portion 62 includes an aperture or hole 63 (e.g., for further allowing room for gases within the cell to flow therethrough to exit the cell).

Figure 8:
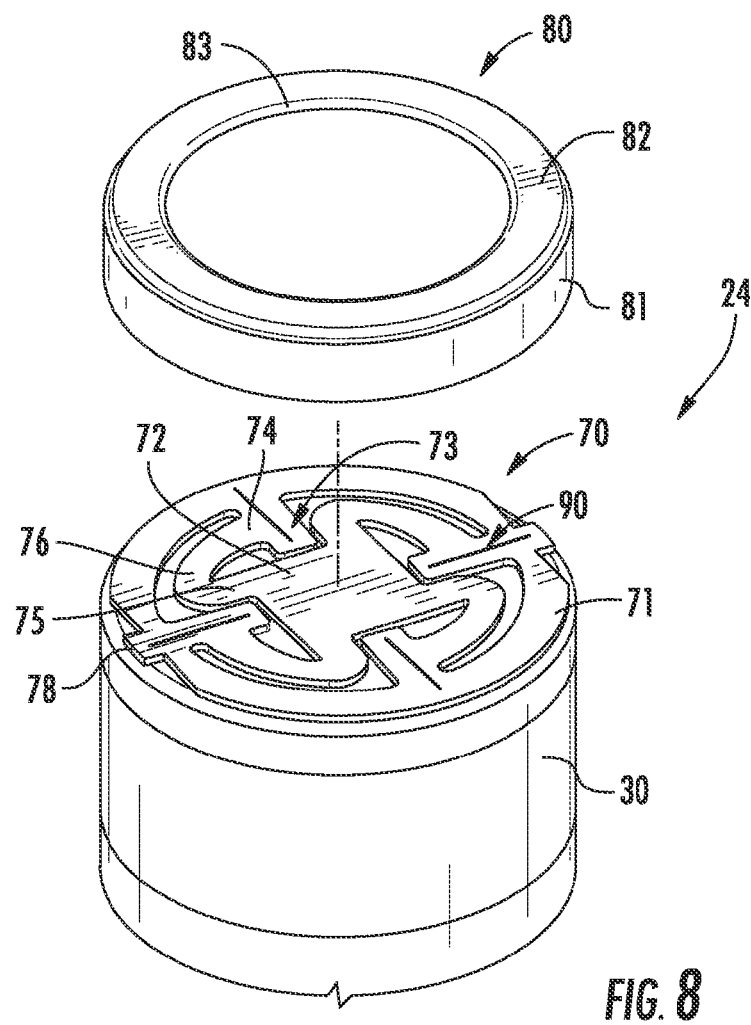
FIG. 8 is a partially exploded view of a portion of the electrochemical cell shown in FIG. 7 without a coil plate, showing the current collector coupled to the cell element according to an exemplary embodiment.

According to an exemplary embodiment, a center or middle portion of the body 61 (i.e., the portion of the body that is not raised) is configured to be coupled (e.g., welded) to an end of the cell element 30 (e.g., to an edge of one of the electrodes of the cell element 30). For example, the coil plate 60 may be laser welded to the cell element along weld lines 67. The raised portions 62 are configured to be coupled (e.g., welded) to a current collector 70 (e.g., as shown in FIG. 8).

According to an exemplary embodiment, the body 61 of the coil plate 60 also includes features to aid in the manufacturing and assembly of the coil plate. For example, the coil plate 60 is shown to include a pair of tabs 64 (e.g., projections, protrusions, extensions) located generally in the center of flats or cuts 65 on the sides of the body 61 of the coil plate 60. These features (e.g., the tabs and/or flats) help to grasp and/or locate the coil plate 60 during manufacturing (e.g., forming the holes and/or raised portions) and/or assembly (properly locating the coil plate with a current collector during welding of the coil plate and current collector). Additionally, according to an exemplary embodiment, the body 61 includes a center hole 66. The center hole allows the current collector 70 to be welded to the end of the housing 25 without being also welded to the coil plate 60 (since the welding of the current collector to the housing is done blindly from outside the housing).

One advantage of using the coil plate 60 is that the coil plate 60 provides a large surface for welding to the end of the cell element 30, while still allowing the gas inside the cell element 30 to escape. Further, the coil plate 60 provides a large surface for welding to a current collector (e.g., current collector 70). Another advantage of the coil plate 60 is that the coil plate 60 provides support to the wound electrodes of the cell element 30 to prevent the wound electrodes from extending or telescoping when handling and/or assembling the cell element 30. Further, the coil plate 60 provides a path to transfer the force from the cell element 30 to the inside corners or shoulders of the cell housing 25 (e.g., the weight of the cell element 30 is carried by the inside corners or shoulders of the bottom 27 of the cell housing 25). Another advantage of the coil plate 60 is that the coil plate 60 enhances the thermal conductivity between the cell element 30 and the bottom 27 of the cell housing 25 (e.g., to increase the efficiency of the thermal management of the cell 24).

Figure 9:
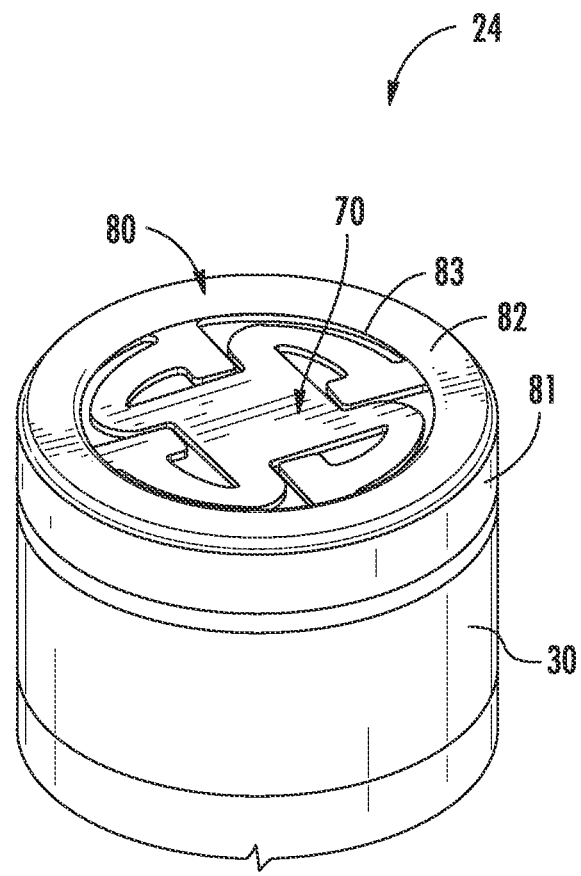
FIG. 9 is a partial perspective view of a portion of the electrochemical cell shown in FIG. 8 showing the insulator provided partially around the current collector and cell element according to an exemplary embodiment.

As shown in FIG. 9, the coil plate 60 is shown to have a specific geometry (e.g., with specific dimensions, thickness, shapes, cutouts, etc.). It should be noted that one of ordinary skill in the art would readily recognize that other possible geometries are available, and are included within the scope of this application.

Figure 8A:
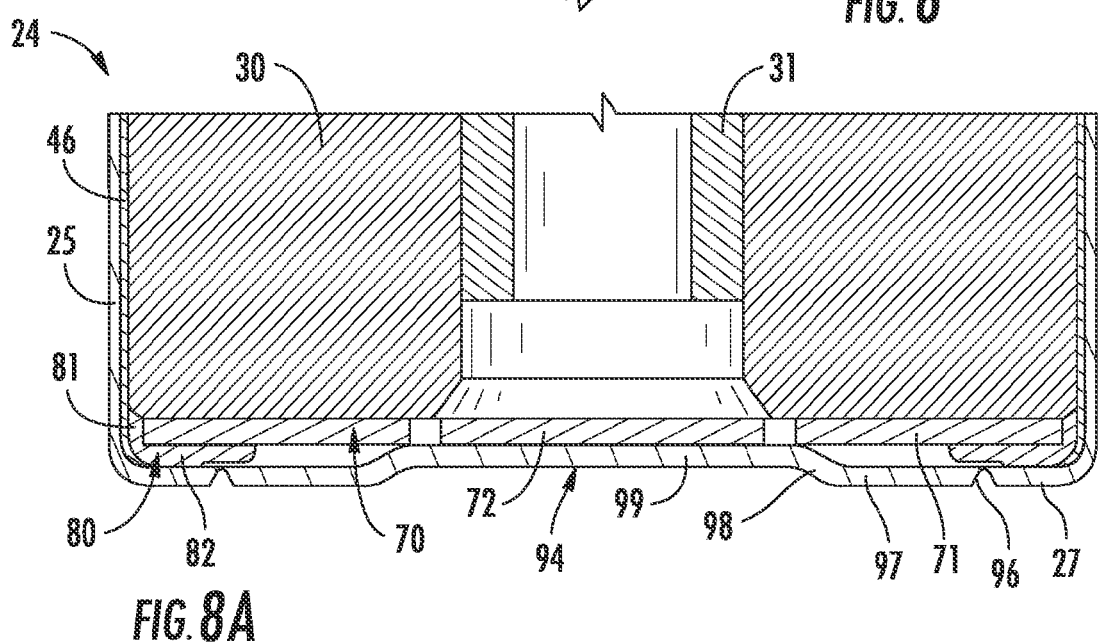
FIG. 8A is a cross-sectional view of the electrochemical cell of FIG. 8.

Referring now to FIGS. 8 and 8A, a member or element provided in the form of a current collector 70 is shown without the coil plate 60 so that it is instead coupled (e.g., welded) to the cell element 30 according to another exemplary embodiment. The current collector 70 may be formed from a relatively thin sheet of conductive material (e.g., sheet metal), by for example, a stamping operation (e.g., a multi-stage progressive die), a laser cutting operation, a wire cutting operation, etc. or may be formed by an extrusion process. According to an exemplary embodiment, the current collector 70 may be formed from a material having a thickness of between approximately 0.5 and 2 millimeters, but may have a greater or lesser thickness according to other exemplary embodiments. According to various exemplary embodiments, the current collector 70 may be formed from any of a wide variety of conductive materials such as aluminum or an aluminum alloy (e.g., for a positive current collector), copper or a copper alloy (e.g., for a negative current collector), nickel-plated copper or an alloy thereof, etc.

As shown in FIGS. 8 and 8A, the current collector 70 includes a first or outer member 71 (e.g., outer or outside ring, portion, circle, body, etc.) that is connected to a second or inner member 72 (e.g., inner or center ring, portion, circle, body, etc.) by a plurality of members or connectors 73 (e.g., arms, limbs, legs, extensions, projections, etc.). As seen in FIG. 8, the outer member 71 is connected to the inner member 72 by four connectors 73. However, according to other exemplary embodiments, the outer member 71 may be connected to the inner member 72 by a greater or lesser number of connectors having the same or different configuration as shown in FIG. 8.

According to the exemplary embodiment shown in FIG. 8, the outer member 71 is provided in the form of a ring or ring-like structure. In the embodiment shown, a perimeter of the outer member 71 substantially matches/aligns with the perimeter of the cell element 30. Also, according to the exemplary embodiment shown in FIG. 8, the inner member 72 has a generally square or rectangular shape, although the inner member 72 could take other shapes, such as round or circular.

According to the exemplary embodiment shown in FIG. 8, each of the plurality of connectors 73 includes a first portion 74 connected to the outer member 71 and a second portion 75 connected to the inner member 72. As shown in FIG. 8, the first portion 74 of each of the connectors 73 extends out from the outer member 71 in a generally perpendicular direction, while the second portion 75 of each of the connectors 73 extends out from the inner member 72 in a generally perpendicular direction. A middle or intermediate portion 76 of each of the connectors 73 couples or connects the first and second portions 74, 75 together. As shown in FIG. 8, the middle portion 76 of each of the connectors 73 has a generally smooth, rounded or curved shape. According to an exemplary embodiment, the inner member 72 can move relative to the outer member 71 because of the flexibility of the connectors 73. According to an exemplary embodiment, the generally smooth, rounded or curved shape of the connectors 73 (e.g., the middle portion 76 of the connectors 73) aids in the flexibility of the current collector 70.

Figure 11:
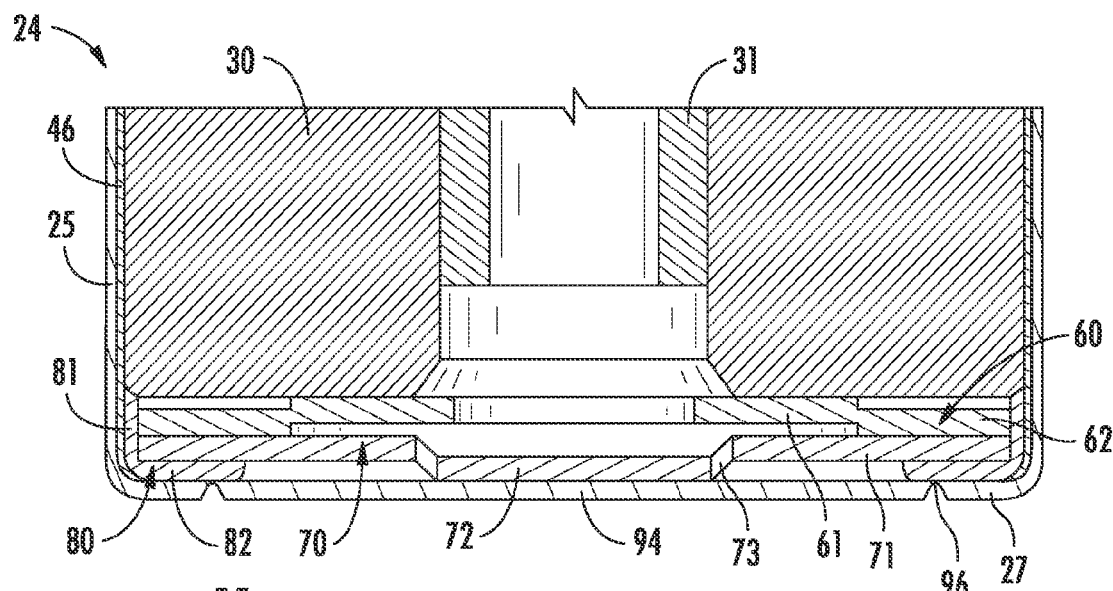
FIG. 11 is a cross-sectional view of a portion of the electrochemical cell shown in FIG. 3 according to an exemplary embodiment.

According to an exemplary embodiment, the outer member 71 of the current collector 70 is coupled (e.g., laser welded) to the cell element 30 (e.g., as shown in FIG. 8), for example, along weld lines 90. In other words, the outer member 71 of the current collector 70 may be welded directly to the end of the cell element 30 (e.g., to the edge of one of the electrodes of the cell element). According to an exemplary embodiment, the inner member 72 of the current collector 70 is coupled (e.g., laser welded) to the end or bottom portion of a housing of the cell (e.g., to a vent 94 of the bottom 27 of the housing 25 as shown in FIGS. 8A and 11).

According to an exemplary embodiment, the geometry of the outer member 71, connectors 73, and inner member 72 define a plurality of cutouts or slots 92 (e.g., apertures, holes, etc., as identified in FIG. 7). These cutouts or slots 92 allow the current collector 70 to substantially flex (e.g., move, bend, deflect, etc.) if required (e.g., when a vent 94 deploys from the bottom 27 of the housing 25). As shown in FIG. 8, the current collector 70 has four cutouts 92. However, according to other exemplary embodiments, the current collector 70 may have a greater or lesser number of cutouts.

Figure 12:
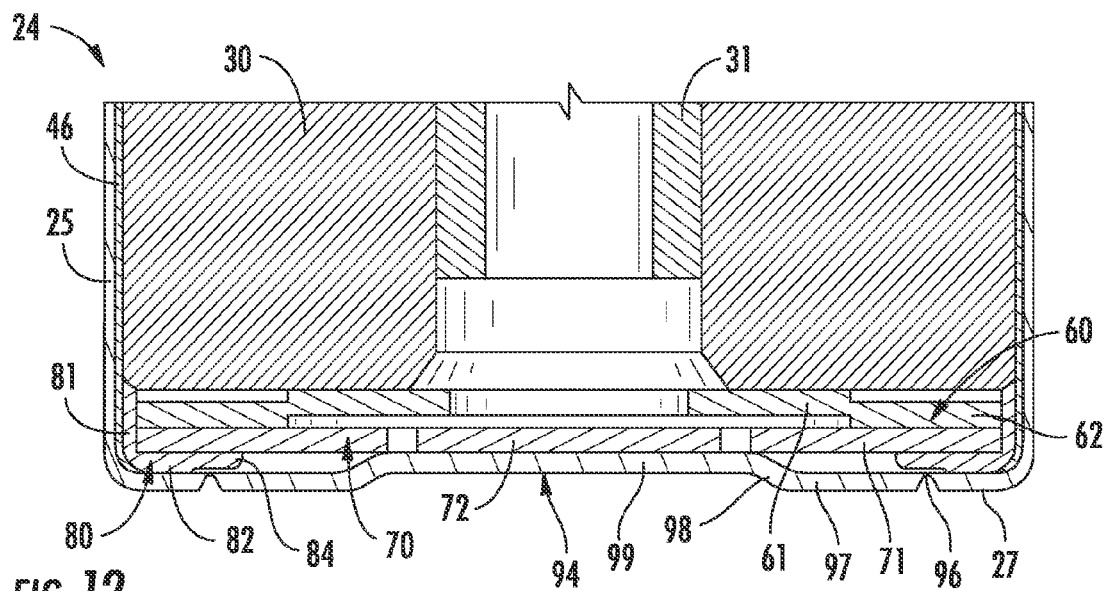
FIG. 12 is a cross-sectional view of a portion of an electrochemical cell according to another exemplary embodiment.
Figure 13:
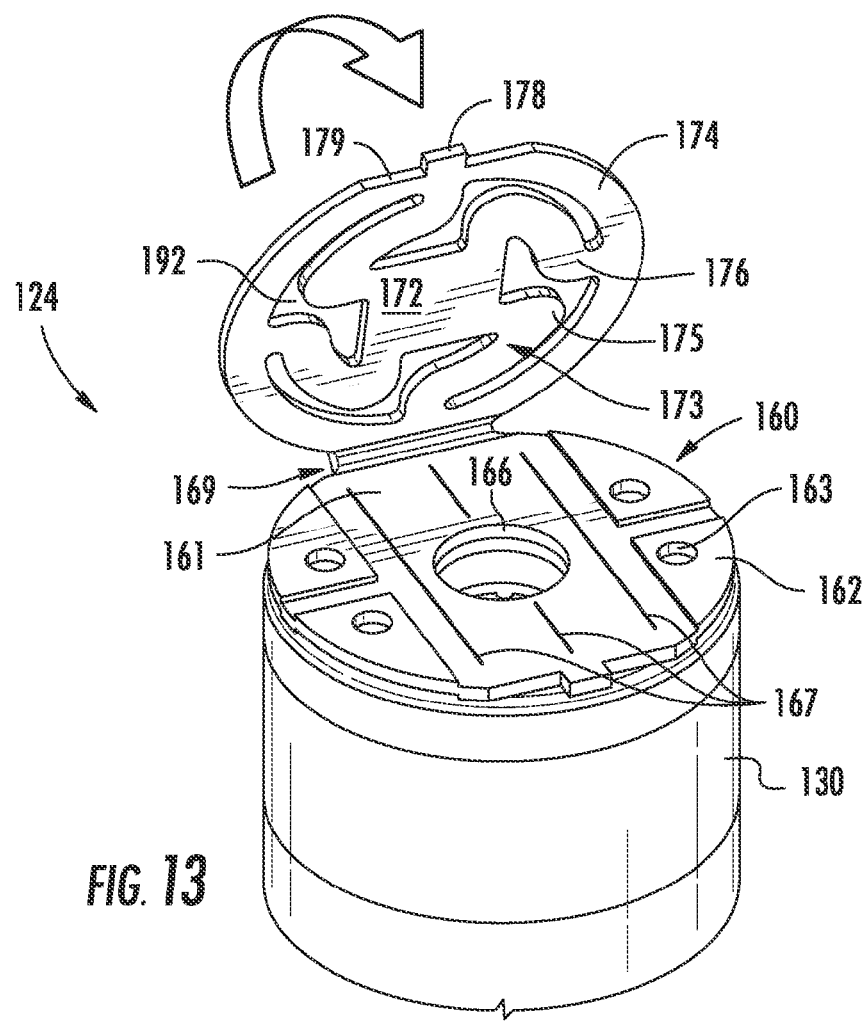
FIGS. 13 and 14 are partial perspective views of a one piece coil plate and current collector coupled to a cell element according to an exemplary embodiment.

Having a flexible current collector 70 allows for increased length of the cell element 30 inside the housing 25 (e.g., to maximize the power capacity of the cell) because the cell element 30 is no longer required to move within the cell housing 25. The flexible current collector 70 also allows the cell element 30 to remain substantially fixed within the cell housing 25 during deployment of a vent (e.g., vent 94 as shown in FIGS. 11-13). The flexible current collector 70 also helps to isolate the vent from shock and vibration during handling and assembly and during use of the cell 24. Further, the shape and geometry of the connectors 73 in relation to the cutouts 92 of the current collector 70 allows for increased flexibility of the current collector 70 (e.g., during deployment of the vent 94) as compared to conventional current collectors. Having increased flexibility offers a more robust (e.g., more repeatable) design of the vent 94. In other words, having greater flexibility of the current collector 70 allows the vent 94 to more easily completely separate from the bottom 27 of the housing 25 during venting of the cell 24.

Still referring to FIG. 8, the current collector 70 includes features to aid in the manufacturing and assembly of the current collector. For example, the current collector 70 is shown to include a pair of tabs 78 (e.g., projections, protrusions, extensions) located generally in the center of flats or cuts 79 (e.g., as identified in FIG. 7) on the sides of the current collector 70. These features (e.g., the tabs and/or flats) help to hold onto and/or locate the current collector 70 during manufacturing (e.g., forming the cutouts to form the arms and/or connectors) and/or assembly (e.g., welding the outer member to the coil plate and/or cell element).

As shown in FIG. 8, the current collector 70 is shown to have a specific geometry (e.g., with specific dimensions, thickness, shapes, cutouts, etc.). It should be noted that one of ordinary skill in the art would readily recognize that other possible geometries are available, and are included within the scope of this application.

Referring now to FIG. 9, a member shown as an insulator 80 is shown provided about or over a portion of the end of the cell element 30, including a portion of the current collector 70 according to an exemplary embodiment. The insulator 80, according to an exemplary embodiment, is configured to aid in electrical isolation of the cell element 30, coil plate 60 (if present), and current collector 70 from the inside of the housing 25 of the cell 24 (e.g., as shown in FIG. 11). As shown in FIGS. 9 and 11, the insulator 80 has a generally L-shape configuration and includes a first portion 81 and a second portion 82 extending out from the first portion 81 at generally a right angle. The first portion 81 is configured to fit over a portion of the side of the cell element 30 and the second portion 82 is configured to fit over a portion of the end of the current collector 70, a portion of the end of the coil plate 60 (if present), and a portion of the end of the cell element 30. According to an exemplary embodiment, the second portion 82 defines an opening 83.

According to an exemplary embodiment, the insulator 80 may be formed from a material having a thickness of between approximately 0.01 and 1 millimeters, but may have a greater or lesser thickness according to other exemplary embodiments, such as up to 5 millimeters. According to an exemplary embodiment, the insulator 80 is made from a flexible, electrically insulating material, such as a polymeric material (e.g., a polyimide), although the insulator 80 need not be flexible. According to one exemplary embodiment, the insulator 80 may be a polyetherimide (e.g., such as ULTEM®). According to other exemplary embodiments, the insulator 80 is made from polyethylene (PE), polypropylene (PP), polyphenylene sulfide (PPS), polyetheretherketone (PEEK), or any other suitable material.

As shown in FIG. 9, the insulator 80 is shown to have a specific geometry (e.g., with specific dimensions, thickness, shape, steps, etc.). It should be noted that one of ordinary skill in the art would readily recognize that other possible geometries are available, and are included within the scope of this application.

Figure 10:
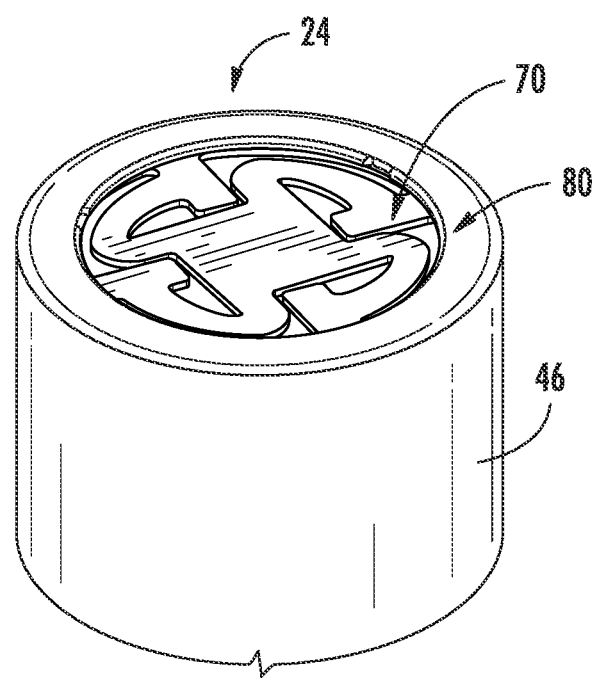
FIG. 10 is a partial perspective view of a portion of the electrochemical cell shown in FIG. 9 showing an insulative wrap provided at least partially around the insulator, current collector, and cell element according to an exemplary embodiment.

Referring now to FIG. 10, a member shown as a protective or electrically insulative wrap 46 is shown provided about or over a portion of the external surface of the cell element 30, including a portion of the insulator 80, according an exemplary embodiment. The protective or electrically insulative wrap 46, according to an exemplary embodiment, is configured to aid in electrical isolation of the cell element 30 (and other components) from the inside of the housing 25 of the cell 24 (e.g., as shown in FIG. 11).

According to an exemplary embodiment, the protective or electrically insulative wrap 46 may be formed from a material having a thickness of between approximately 0.01 and 1 millimeters, but may have a greater or lesser thickness according to other exemplary embodiments. According to an exemplary embodiment, the protective or electrically insulative wrap 46 is made from a flexible, electrically insulting material, such as a polymeric material (e.g., a polyimide). According to one exemplary embodiment, the protective or electrically insulative wrap is made from Kapton®, which is commercially available from E. I. du Pont de Nemours and Company. According to other exemplary embodiments, the protective or electrically insulative wrap 46 is made from polyethylene (PE), polypropylene (PP), polyphenylene sulfide (PPS), polyetheretherketone (PEEK), or any other suitable material.

Referring now to FIG. 11, a cross-section of a portion of a cell 24 is shown according to an exemplary embodiment. As shown in FIG. 11, an end of the cell element 30 is coupled to the coil plate 60. The coil plate 60 is coupled to the outer member 71 of the flexible current collector 70. The inner member 72 of the current collector 70 is coupled to the vent 94. The vent 94 is coupled to the bottom 27 of the housing 25.

According to an exemplary embodiment, the vent 94 is configured to allow gases and/or effluent to exit the cell 24 once the pressure inside the cell reaches a predetermined amount (e.g., during a rise in cell temperature). When the vent 94 deploys (e.g., activates, opens, separates, etc.), the gases and/or effluent inside the cell exit the cell in order to lower the pressure inside the cell. According to an exemplary embodiment, the vent 94 acts as a safety device for the cell during a high pressure occurrence.

According to an exemplary embodiment, the vent 94 is located in the bottom or bottom portion of the housing 25. According to other exemplary embodiments, the vent 94 may be located elsewhere (e.g., such as in the lid or cover of the cell). According to another exemplary embodiment, the vent 94 may be located in a cover or bottom that is a separate component from the housing that in turn is coupled to the housing (e.g., by a welding operation).

As shown in FIG. 11, the vent 94 is coupled to the bottom 27 of the housing 25 by an annular fracture groove 96 (e.g., ring, trough, pressure point, fracture point, fracture ring, etc.). According to an exemplary embodiment, the annular fracture groove 96 has an inverted V-shaped bottom and is configured to break away (i.e., separate) from the bottom 27 of the housing 25 when the vent 94 deploys. According to other exemplary embodiments, the bottom of the annular fracture groove 96 may have another shape (e.g., rounded shape, curved shape, U-shape, etc.).

Figure 11A:
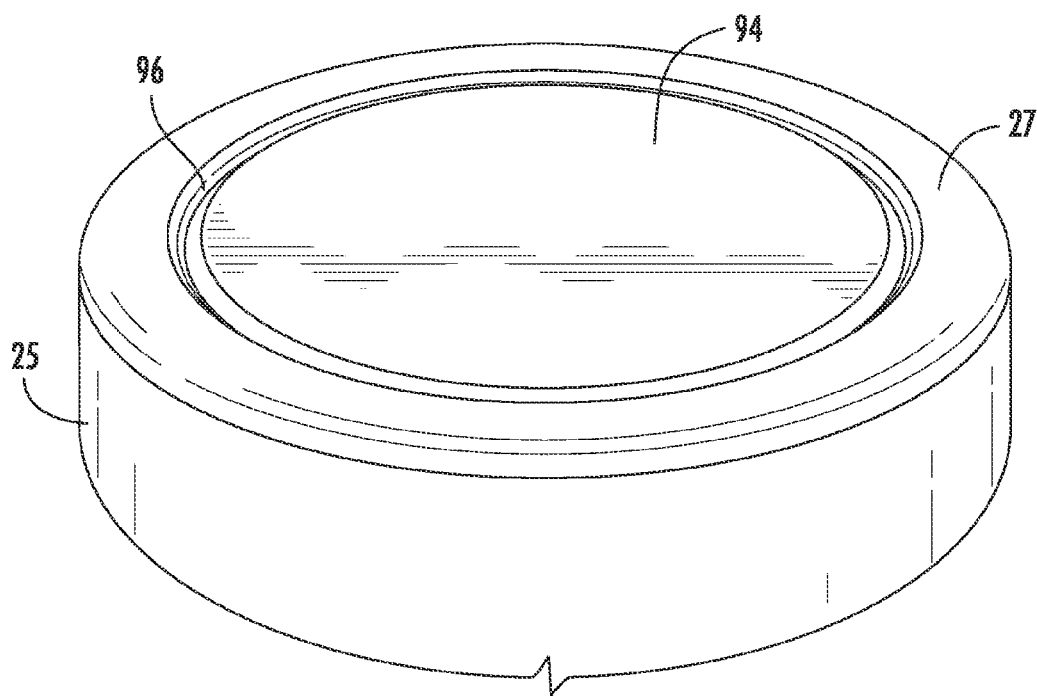
FIG. 11A is a partial perspective view of a portion of a bottom of the electrochemical cell shown in FIG. 11 according to an exemplary embodiment.

According to an exemplary embodiment, the vent 94 (e.g., the annular fracture groove) is formed by tooling located external the housing 25. For example, the annular fracture groove 96 may be formed by stamping or embossing the bottom 27 of the housing 25 (e.g., as shown in FIG. 11A). The tooling tolerance is only affected by one side of the tool, allowing for a more consistent annular fracture groove 96, resulting in a more consistent and repeatable opening of the vent 94. The depth, shape, and size of the fracture groove 96 may be easily modified simply by changing the tooling. Additionally, the vent 94 is easy to clean and inspect since the vent 94 (and annular fracture groove 96) is located on an external side of the housing 25.

As stated earlier, the vent 94 is configured to deploy once the pressure inside the cell 24 reaches a pre-determined amount. When the vent 94 deploys, the annular fracture groove 96 fractures and separates the vent 94 from the bottom 27 of the housing 25. Once the vent 94 deploys, the internal gases and/or effluent are able to flow past the fractured edge of the vent 94.

By having the vent 94 fully separate from the bottom 27 of the housing 25, the vent 94 acts as a current interrupt or current disconnect device. This is because the separation of the vent 94 from the bottom 27 of the housing 25 disrupts the flow of current from the cell element 30 (through the coil plate 60 and the current collector 70) to the housing 25. In this way, the vent 94 acts not only as an over-pressure safety device, but also as a current disconnect device.

According to the exemplary embodiment shown in FIG. 11, the cell element 30 does not move during deployment of the vent 94 (i.e., the cell element remains substantially fixed or stationary). According to such an exemplary embodiment, the flexible current collector 70 flexes to aid in the deployment of the vent 94. For example, the connectors 73 of the current collector 70 are configured to flex to deploy the vent 94.

According to an exemplary embodiment, the inner member 72 of the current collector 70 is configured to rotate slightly with respect to the outer member 71 of the current collector 70 when the vent 94 deploys (e.g., when the current collector flexes). A rotation of the current collector (even a slight rotation) aids in fully separating the vent from the bottom of the housing. In other words, rotation of the current collector helps to obtain the complete fracture of the annular fracture groove of the vent during deployment of the vent.

Figure 12A:
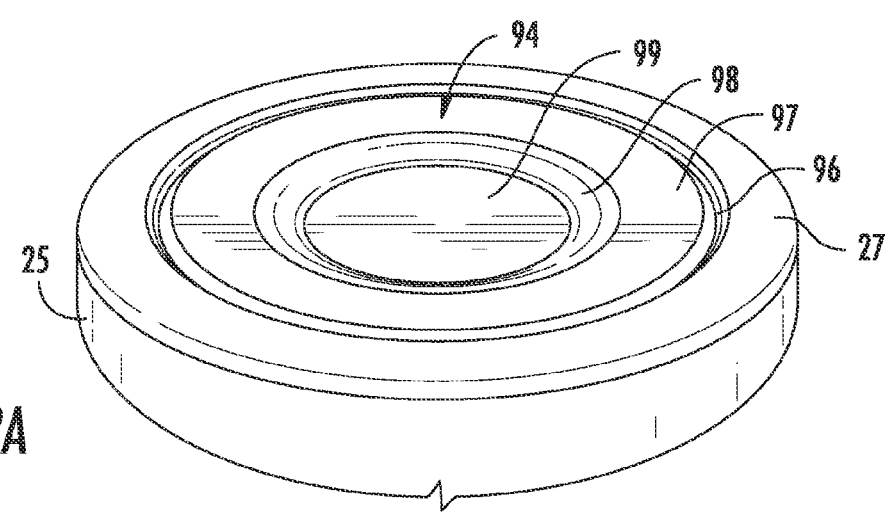
FIG. 12A is a partial perspective view of a portion of a bottom of the electrochemical cell shown in FIG. 12 according to an exemplary embodiment.
Figure 12B:
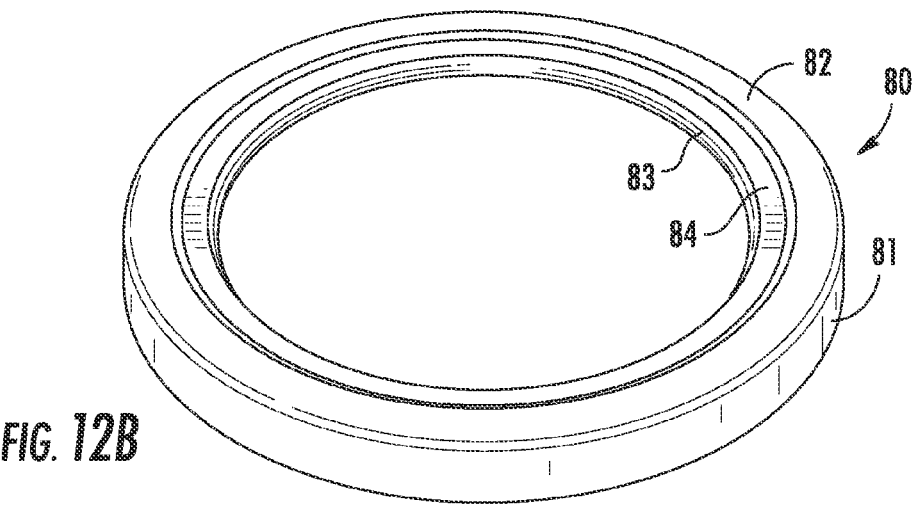
FIG. 12B is a perspective view of an insulator for use in the electrochemical cell shown in FIG. 12 according to an exemplary embodiment.

Referring now to FIG. 12, a cross-section of a portion of a cell 24 is shown according to another exemplary embodiment. While similar to the exemplary embodiment shown in FIG. 11 (with elements in FIG. 12 having the same reference number as similar elements shown in FIG. 11), the cell 24 includes a vent 94 having a first portion 97 and a second portion 99. As shown in FIGS. 12-12A, the first portion 97 is connected to the second portion 99 by an angled portion 98. As such, the first portion 97 is located within a different plane than that of the second portion 99 (e.g., the second portion 98 is a raised center section of vent 94). Having the second portion 99 within a different plane than that of the first portion 97 allows the vent 94 to be coupled to the inner member 72 of the current collector 70 without having to first pre-form (e.g., bend) the current collector 70 (e.g., as shown in FIG. 11). Instead, the first and second portions 97, 99 of the vent 94 can be formed when forming the bottom 27 of the housing 25 (e.g., as shown in FIG. 12A), and the current collector 70 (e.g., the inner member 72) can be then coupled (e.g., laser welded) to the bottom 27 (e.g., the second portion 99 of the vent 94) of the housing 25.

According to an exemplary embodiment, as shown in FIG. 12, the inner member 72 of the current collector 70 is configured to rotate slightly with respect to the outer member 71 of the current collector 70 when the vent 94 deploys (e.g., when the current collector flexes). A rotation of the current collector 70 (even a slight rotation) aids in fully separating the vent 94 from the bottom 27 of the housing 25. In other words, rotation of the current collector 70 helps to obtain the complete fracture of the annular fracture groove 96 of the vent 94 during deployment of the vent 94. As shown, a surface 84 of the second portion 82 of the insulator 80 may be offset from the vent 94 such that the surface 84 does not physically contact the vent 94 and/or the fracture groove 96 of the vent 94.

It should be noted that while the various components are generally shown as being associated with a positive electrode of the cell element, according to other exemplary embodiments, the components may be associated with a negative electrode. Furthermore, while the various components are configured for use with cylindrically wound cell elements, according to another exemplary embodiment, the components may also be used with a series of flat plates (e.g., prismatic cells) or other cell configurations.

Figure 14:
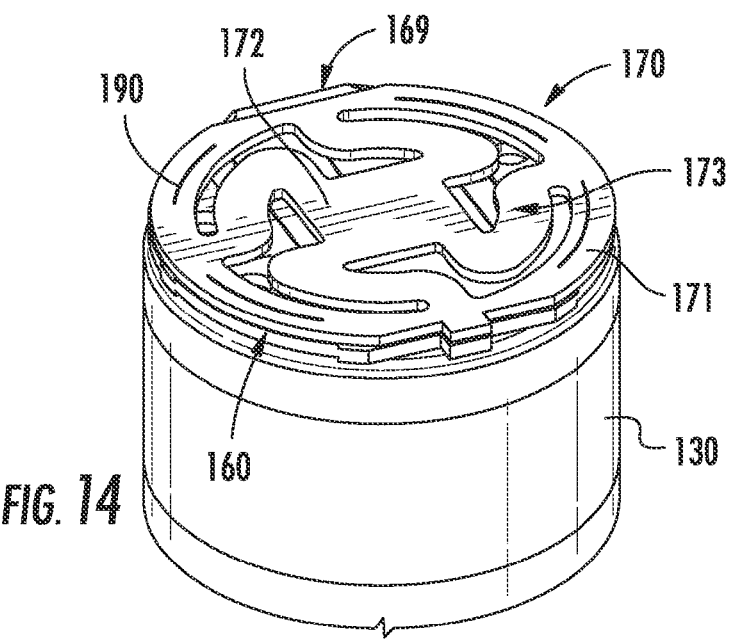

Referring now to FIGS. 13 and 14, a portion of a cell 124 is shown according to another exemplary embodiment. While similar to the exemplary embodiment shown in FIGS. 3-12 (with elements in FIGS. 13 and 14 that are similar to elements in FIGS. 3-12 having reference numbers in the 100 series), the cell 124 includes a one piece coil plate 160 and current collector 170. As shown in FIGS. 13 and 14, the coil plate 160 is connected to (e.g., integrally formed with) the current collector 170 by a hinge or hinge portion 169.

As such, the coil plate 160 and the current collector 170 may be formed as a single, integral component (e.g., a single unitary body) that is then coupled to the cell element 130 of the cell 124. For example, the coil plate 160 and the current collector 170 may be formed by a metal stamping process or other suitable metal forming process. According to an exemplary embodiment, the hinge 169 is formed from a curved or thinned out section that connects an end or side of the coil plate 160 to an end or side of the current collector 170. According to other exemplary embodiments, the hinge 169 may be otherwise suitably formed.

According to an exemplary embodiment, having the coil plate 160 and the current collector 170 formed as a single, integral component allows the cell 124 to be formed in a more efficient manner. For example, the coil plate 160 can be coupled (e.g., welded) to the end of the cell element 130 (e.g., along weld lines 167). The current collector 170 can then be bent or folded over the coil plate 160, with a portion of the outer member 171 resting or contacting the raised portions 162 of the coil plate 160 (e.g., as shown in FIG. 14).

According to one exemplary embodiment, the current collector 170 does not need to be separately welded to the coil plate 160. For example, current can travel from the coil plate 160, through the hinge 169, and to the current collector 170. According to another exemplary embodiment, the current collector 170 may be welded (e.g., laser welded) to the coil plate 160. For example, as shown in FIG. 14, the current collector 170 may be coupled to the coil plate 160 along optional weld lines 190.

According to an exemplary embodiment, the coil plate 160 and the current collector 170 may be formed from a relatively thin sheet of conductive material (e.g., sheet metal), by for example, a stamping operation (e.g., a multi-stage progressive die), a laser cutting operation, a wire cutting operation, etc. or may be formed by an extrusion process. According to an exemplary embodiment, the coil plate 160 and the current collector 170 may be formed from a material having a thickness of between approximately 0.5 and 2 millimeters, but may have a greater or lesser thickness according to other exemplary embodiments. According to various exemplary embodiments, the coil plate 160 and the current collector 170 may be formed from any of a wide variety of conductive materials such as aluminum or an aluminum alloy, copper or a copper alloy, nickel-plated copper or an alloy thereof, etc.

As shown in FIGS. 13 and 14, the single piece coil plate 160 and the current collector 170 is shown to have a specific geometry (e.g., with specific dimensions, thickness, shapes, cutouts, etc.). It should be noted that one of ordinary skill in the art would readily recognize that other possible geometries are available, and are included within the scope of this application.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the electrochemical cell as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An electrochemical cell comprising:
a cell element comprising at least one electrode;
a current collector having an outer member and an inner member, the inner member being coupled to the outer member by a plurality of flexible arms configured to allow the inner member to move relative to the outer member;
a coil plate having a first face directly coupled to the cell element and a second face opposite to the first face, wherein the second face is directly coupled to the current collector to provide an electrical path between the cell element and the current collector; and
a housing having a bottom portion having a vent, the inner member of the current collector being coupled to the vent, wherein the cell element, the coil plate, and current collector are provided within the housing such that when the vent moves from an undeployed position to a deployed position, the cell element remains substantially fixed within the housing.

2. The electrochemical cell of claim 1, wherein the vent is substantially flat and wherein the inner member of the current collector is raised relative to the outer member such that the inner member is coupled to the vent.

3. The electrochemical cell of claim 1, wherein the current collector is substantially flat and wherein the vent comprises a raised center portion coupled to the inner member of the current collector.

4. The electrochemical cell of claim 1, further comprising an insulating ring provided over at least a portion of the current collector between the current collector and the housing.

5. The electrochemical cell of claim 1, wherein the current collector comprises a first tab extending from the outer member to aid in manufacturing of the electrochemical cell, wherein the coil plate comprises a second tab extending away from the coil plate to aid in manufacturing of the electrochemical cell, and wherein the first tab and the second tab are aligned with each other.

6. The electrochemical cell of claim 1, wherein the flexible arms are configured to bend to allow the inner member to move axially with respect to the outer member when the vent moves from the undeployed position to the deployed position.

7. The electrochemical cell of claim 1, wherein the housing comprises a shoulder configured to hold the cell element within the housing.

8. The electrochemical cell of claim 1, wherein the coil plate is coupled to an edge of the at least one electrode of the cell element.

9. The electrochemical cell of claim 1, wherein the coil plate includes a plurality of raised portions configured to aid in allowing gas to escape the electrochemical cell during deployment of the vent.

10. The electrochemical cell of claim 9, wherein each of the plurality of raised portions of the coil plate includes an aperture.

11. The electrochemical cell of claim 9, wherein the current collector is coupled to the raised portions.

12. The electrochemical cell of claim 11, wherein the outer member of the current collector is coupled to the raised portions.

13. The electrochemical cell of claim 1, wherein the coil plate and the current collector are coupled together via a hinge member.

14. The electrochemical cell of claim 13, wherein the hinge member is disposed between the outer member of the current collector and an outer edge of the coil plate.

15. The electrochemical cell of claim 1, wherein the inner member is not directly coupled to the coil plate.

16. The electrochemical cell of claim 1, comprising a first weld between the cell element and the coil plate, and a second weld between the coil plate and the outer member of the current collector.

17. The electrochemical cell of claim 16, wherein the first weld is linear and the second weld is arcuate.

18. The electrochemical cell of claim 17, wherein the first weld extends through a middle region of the coil plate such that the coil plate blocks telescoping of the cell element when the vent moves to the deployed position.

* * * * *